Aug. 29, 1939.  G. WAITE ET AL  2,171,496
PARACHUTE HARNESS RELEASE COUPLING
Original Filed Aug. 5, 1936  3 Sheets-Sheet 3

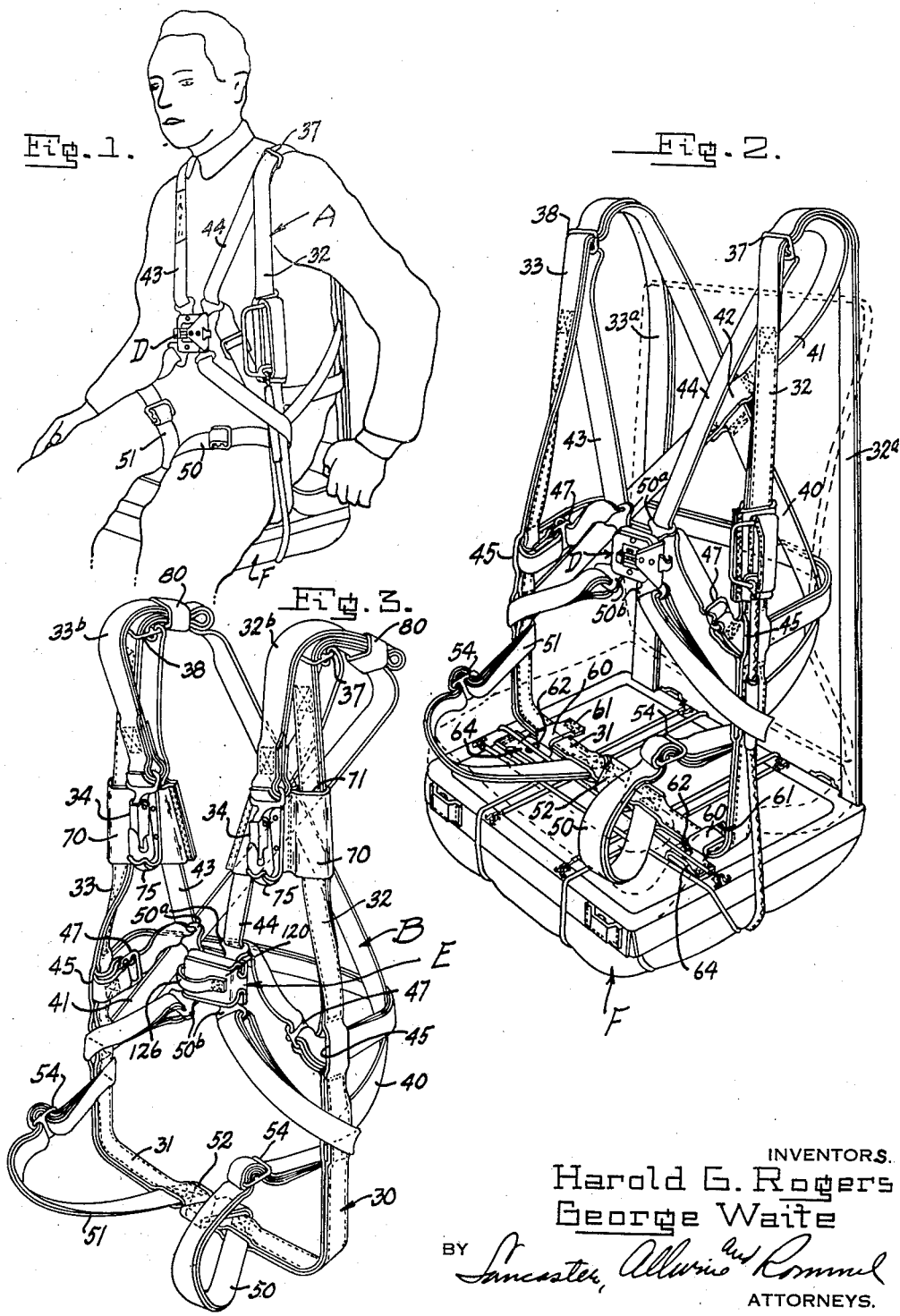

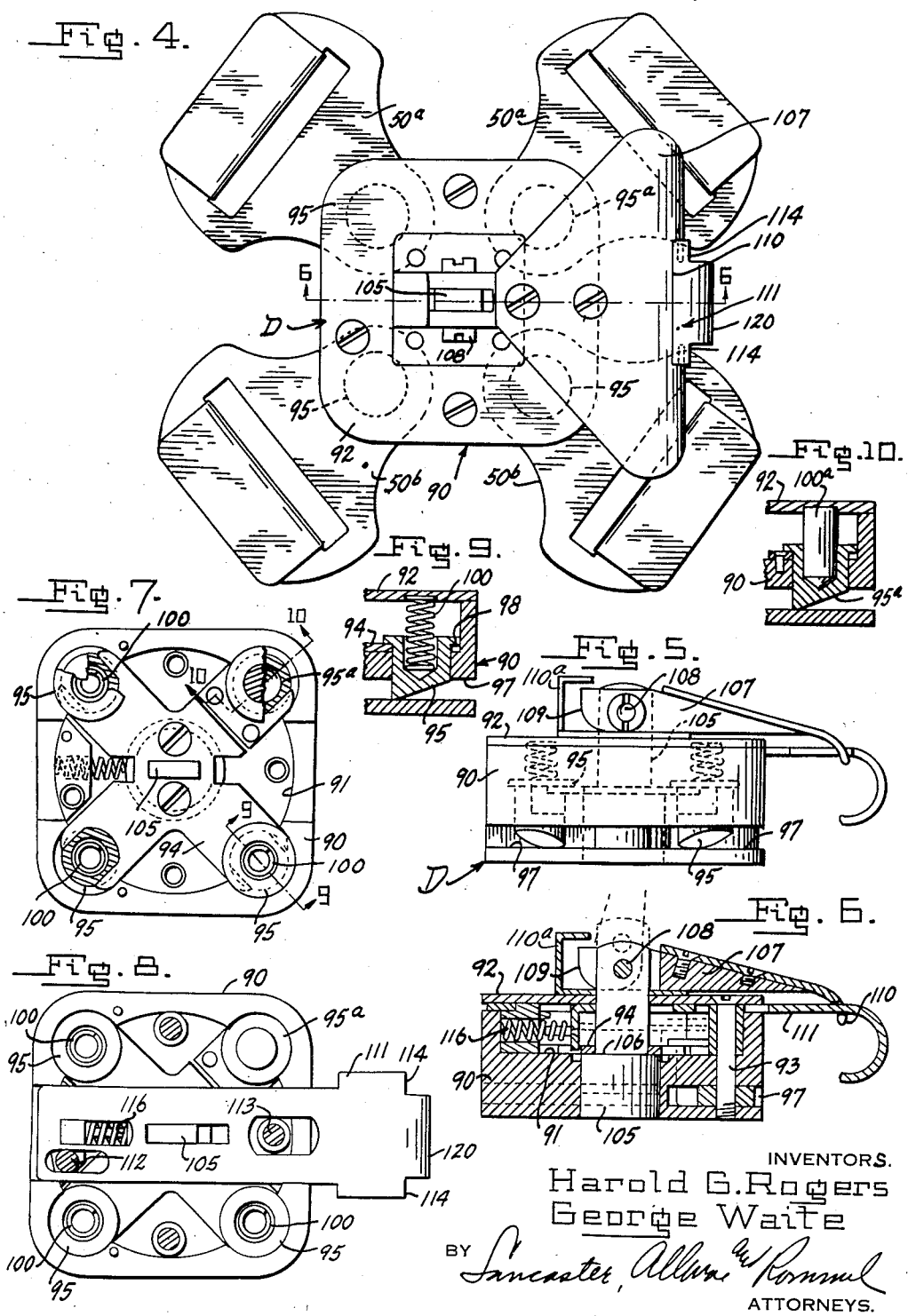

INVENTORS.
Harold G. Rogers
George Waite
BY Lancaster, Allwine and Rommel
ATTORNEYS.

Patented Aug. 29, 1939

2,171,496

UNITED STATES PATENT OFFICE 2,171,496

PARACHUTE HARNESS RELEASE COUPLING

George Waite and Harold G. Rogers, Buffalo, N. Y., assignors to Irving Air Chute Co. Inc., Buffalo, N. Y., a corporation of New York Original application August 5, 1936, Serial No. 94,470, now Patent No. 2,164,130, dated June 27, 1939. Divided and this application February 26, 1938, Serial No. 192,872

7 Claims. (Cl. 24—205)

This invention relates to improvements in parachute apparatus, and has more particular reference to single point quick release fittings for the parachute harness.

The present application is a division out of our co-pending application Serial No. 94,470, filed August 5, 1936, and which issued as Patent No. 2,164,130 on June 27, 1939.

Other objects and advantages of this invention will be apparent during the course of the following detailed description.

In the accompanying drawings, forming a part of this specification, wherein for the purpose of illustration are shown preferred and modified forms of the invention, Figure 1 is a perspective view of the harness shown in our above identified parent application showing the improved quick release fitting.

Figure 2 is a perspective view of the harness also showing the improved quick release fitting.

Figure 3 is a perspective view of another type of harness with a modified form of quick release fitting.

Figure 4 is a plan view of one type of improved quick release fitting.

Figure 5 is a side elevation of the fitting shown in Figure 4 with the connector parts detached therefrom.

Figure 6 is a cross sectional view taken substantially on the line 6—6 of Figure 4.

Figure 7 is a fragmentary plan view of the casing portion of the fitting shown in Figure 4, with the cap removed.

Figure 8 is a view similar to Figure 7 but showing a detent member which prevents accidental opening of the fastening bolts.

Figures 9 and 10 are cross sectional views taken substantially on their respective lines in Figure 7 of the drawings.

Figure 10A:
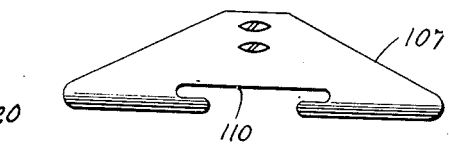

Figure 10$^a$ is an end view of the detent operating lever shown in Figure 4, showing the T-shaped slot therein.

Figure 11:
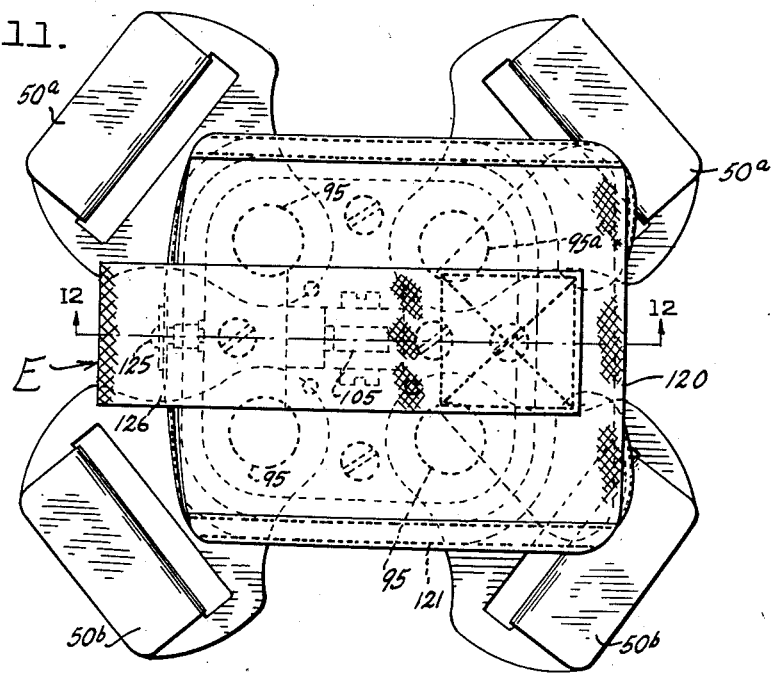

Figure 11 is a modified form of quick release fitting with a different type of detent to prevent accidental opening thereof.

Figure 12:
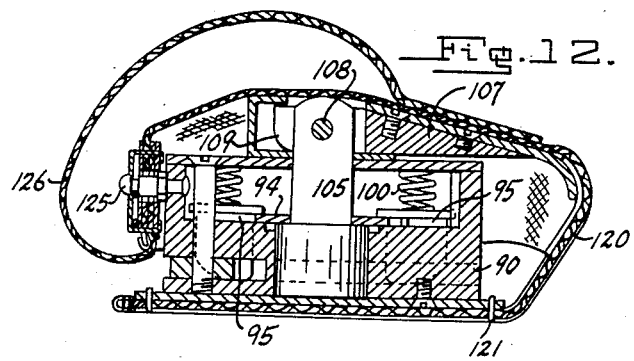

Figure 12 is a cross sectional view taken substantially on the line 12—12 of Figure 1.

Figure 13:
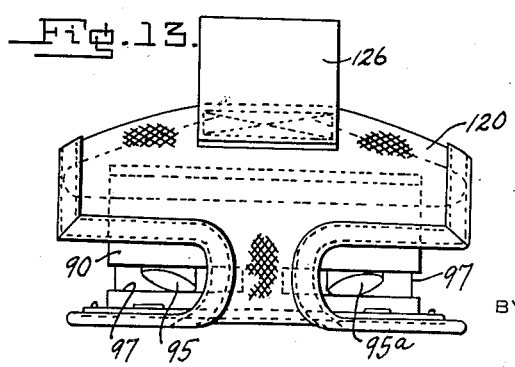

Figure 13 is a side elevation of the fitting shown in Figure 11.

In the drawings, wherein similar reference characters designate corresponding parts throughout the several views, the letter A may designate a harness adapted for use with an attached pack. B is a similar harness for use with a detachable type of pack. D and E are forms of quick release fasteners or fittings used with the single point release type of harnesses A and B.

In the main the harnesses A and B are of identical construction except that harness A is used with an attached pack and the harness B is used with a detachable emergency type of pack. The latter type of harness, as has been set forth in U. S. Patent #1,958,000, may be worn by the aviator independent of the pack, and the latter may be used when the emergency arises.

The harnesses A and B each includes a supporting sling 30 consisting of double webbing stitched together and providing a seat portion 31 and vertical riser webs 32 and 33. In the form of harness A the riser webs 32 and 33 are continued rearwardly of the wearer at 32$^a$ and 33$^a$, in suspension lines which extend into the pack F, where they are connected to the shroud lines of the parachute in the well known manner. The container of the pack F is preferably connected to the seat portion 31 of the harness in an improved manner to be subsequently described. In the form of harness B the suspension lines 32$^b$ and 33$^b$ are extended forwardly upon the harness in a manner to be subsequently described, and at their extremities are provided with coupling parts 34 which may be of any approved type, but in the present instance are snap fasteners which are releasably held in position similar to the manner disclosed in U. S. Patent #2,016,236, but in a modified manner which will be hereinafter described.

At the shoulders of the harness the riser webs 32 and 33 are provided with adapters 37 and 38, by means of which the straps are held in position so that the harness may be adjusted to fit the stature of the wearer. These adapters 37 and 38 are of the double slot type, that is, a central bar is provided and the webbing or straps of the harness may be threaded through either or both of the slots around the cross bar. In the present form of harness the riser webs 32 and 33 are threaded through only the front or upper slot of the adapters so that the adapters may be readily slid therealong.

Each of the harnesses A and B includes a pair of crossed back straps 40 and 41 which are connected in a fixed stitched relation between the layers of the U-shaped supporting sling on the riser webs 32 and 33 respectively just above the seat portion 31. These straps 40 and 41 extend upwardly across the back of the wearer and are crossed in the middle of the back of the wearer in a slidable loop adjustment, as shown at 42 in Figure 2 of the drawings. They respectively continue over the shoulders of the wearer and are threaded through both slots of the adapters 38 and 37 respectively, that is, they extend through both slots of each adapter, around the cross bar thereof, as shown in Figures 2 and 3 of the drawings, and thence they continue downwardly at the front of the wearer in a downwardly slightly convergent relation, as shown at 43 and 44 in Figures 2 and 3. These breast straps 43 and 44 are extended slidably through suitable tunnels or loops 45 in the riser webs 32 and 33 of the harness at a point above the lower end fixed connections of the straps 40 and 41. The end of each strap which thus passes through a loop 45 is extended horizontally across the back of the wearer and provided with an adapter 47 threaded adjustably upon the other horizontal strap. Thus these portions are adjustably doubled upon each other so that the harness may be adapted to the girth of the wearer.

The straps 43 and 44 thus form by means of their connection with the adapters 37 and 38 and their lower connection through the tunnels or loops 45 in the riser webs, breast loops upon which are threaded coupling or fastener parts 50ª for release connection with the quick release fitting D or E of the harness, as the case may be.

Leg straps 50 and 51 are provided. They are formed by a strip of double webbing which is spirally wound about the strap 31 and extended between the layers of said seat strap and stitched thereto as shown at 52 in the drawings; the straps 50 and 51 loosely extending for a greater length than leg straps of quick release harnesses heretofore provided. The ends of the leg straps 50 and 51 are doubled upon each other in a loop arrangement which may be adjusted as to length by means of adapters 54. The ends of the said loop arrangement of the leg straps have coupling parts 50ᵇ for release connection with the quick release fitting D or E, as the case may be. It was above mentioned that the coupling parts 50ª and 50ᵇ are releasably connected to the fitting or coupling D or E. In the preferred instance, however, one of these connector parts 50ª or 50ᵇ is permanently connected to one of the detents or members of the quick release fitting. The latter is preferably connected to the connector part 50ª on the left hand side of the harness, although this is purely optional. The leg straps 50 and 51, as shown in Figure 3, are first extended at the inside of the riser web and then looped externally at the outer side of the riser web and brought up into position for connection with the quick release fastening means. This arrangement enables the leg straps to be freely loosened from the body of the wearer upon release of the quick connector fastener.

In the form of pack attached harness A, the pack F as before mentioned is attached to the seat strap 31. Heretofore this attachment was fixed and permanent, but in the present invention I provide tabs 60 which are permanently stitched at 61 at one end of each and at the other end is provided with "lift the dot" snap fastener 62. This "lift the dot" snap fastener 62 has the male portion thereof upon the free end of the tab 60 and the female portion thereof upon the upper flap of a loop 64 in which the free end of the tab 60 is slipped. The dot of the "lift the dot" snap fastener is remote from the seat strap 31 so that it can only be released by pulling the "lift the dot" snap fastener towards the seat strap. In other words a pull upon the seat pack away from the seat strap will not open the "lift the dot" snap fastener.

In the emergency pack harness B stiffened web and coupling supports 70 are provided. They are provided with passageways therethrough, the axes of which are acute to each other. One of these passageways 71 receives the riser web 32 or 33, as the case may be, and the other passageway receives the upper portion of the breast strap 43 or 44, as the case may be. These supports 70 are slidable along the straps which they encompass and the webbing of the support 70 is suitably stiffened to hold the straps 32 and 44, or 33 and 43 in definite relation. Of course the supports 70 are provided with spring clips or members 75, as has been more adequately described in U. S. Patent #2,016,236 for releasably supporting the snap fasteners or coupling parts 34 in position, so that the complementary coupling parts upon the emergency pack may be attached thereto. The coupling parts 34 are always held in definitely spaced relation upon the harness and ready for emergency attachment at all times. On the harness B the loose ends of the suspension webs 32ᵇ and 33ᵇ are releasably held in suitable fabric keepers 80, at the shoulders of the wearer.

The single point release type of harness may be used with the type of quick release fitting shown in U. S. Patents #1,899,656, or #1,842,611, or it may be of the improved type D or E shown in the drawings.

Referring to the quick release fitting or coupling constructions D and E, the same are in many respects similar except insofar as the detent releasing members thereof are concerned. The fittings D and E each include a frame or casing portion 90 having a compartment 91 opening at the top thereof and closed by means of a detachable cover plate 92, which is held in place by detachable bolts 93. The compartment 91 is adapted to reciprocably receive a spider or like member 94 upon the arms of which are mounted detents 95. The casing 90 is provided near the bottom thereof with lateral openings 97 across which the detents 95 operate. The detents 95 have sloping faces opening in the compartment 97 and which face the peripheral surfaces of the casing so that the connector parts 50ª and 50ᵇ may with facility slip into place upon the detents 95; the parts 50ª and 50ᵇ being provided with openings which receive the detents 95 in a manner which is well known to those skilled in the art. The spider 94 is provided with a series of radial arms and the detents 95 have flanged edges 98 resting on these arms so that as the spider is raised in the compartment 91 the detents 95 will be retracted with respect to the openings 97 in order to release the fastener parts 50ª and 50ᵇ of the harness. The springs 100 normally engage between the closure 92 and each of the detents 95 in order to force the latter to a restraining relation, as shown in Figures 5 and 9 of the drawings. As before mentioned it is preferred in the present type of harness to have the connector parts D or E, as the case may be, mounted permanently upon one of the coupling parts 50ª or 50ᵇ of a main connector strap of the harness. To that end, as shown in Figure 10, one of the detents 95ª may have a shank 100ª, in lieu of a spring 100, which abuts the closure 92 and holds the detent 95ª normally in a restraining position as shown in Figure 1. Of course the detent 95ª is not carried by an arm of the spider 95, as is clearly indicated in Figure 7 of the drawings.

In certain prior one point release harnesses the connector mechanism has been operated by radial or turning movement of a member. In the present case, however, it is intended to release the detent members by a swinging movement of a pivoted member, without any turning movement. To that end a plunger member 105 is centrally or axially mounted upon the casing for transverse movement with respect thereto in a line parallel with the movement of the detents 95. It has a shoulder 106 against which the spider 95 centrally abuts so that a lifting movement upon the plunger 105 will lift the spider and remove the detents from their openings 97. The means for moving the plunger 105 consists of a lever 107 pivoted at 108 upon the plunger and having a cam extension 109, which when the lever 107 is flat upon the top of the closure 92 of the casing positions the plunger 105 so that the detents 95 are in the position shown in Figure 5, for locking the parts 50ª and 50ᵇ. However, upon pivotal movement of the lever 107 extension 109 cams upon the casing and moves the plunger 105, and detents 95, from a position across the respective passageways 97, and thus disconnect the coupling parts 50ª and 50ᵇ from the casing of the connector D or E, as the case may be. A guard 110ª mounted on the closure 92 prevents anything from interfering with correct action of the cam extension on the closure.

Inasmuch as the lever 107 might be accidentally moved to release the coupling parts 50ª and 50ᵇ from the fitting D or E, a detent mechanism is provided therefor. In the form of connector D it is shown that the lever 107 has a large flanged end which is provided with a T-shaped slot 110 therein. A horizontally slidable plunger detent 111 is mounted for rectilinear movement upon the casing, being suitably apertured to receive pins 112 therein for guiding the path of movement of the detent 111; the same being provided with an opening to miss the flattened shank of the plunger 105, as shown in the drawings. This detent 111 has lateral flanges 114 near the end thereof which lie in the widened portion of the T-shaped slot 110 of the lever 107. A spring 116 normally urges the detent 111 into this position, as shown in Figures 4 to 10 inclusive of the drawings, and it is only when the detent 111 is pushed inwardly to position the reduced end 120 at the fore end of the detent 111 in the narrow portion of the T-shaped slot 110, that the lever 107 can be swung to open the detents 95, in a manner which is perfectly apparent from the above description.

Referring to the coupling device E, a guard to prevent accidental opening of the operating lever 107 comprises a fabric housing 120, riveted and stitched at 121 upon the bottom of the casing 90. It is hinged as shown in Figure 13, and covers the sides and top of the housing 90, leaving the slots 97 open to permit free ingress and egress of the connector parts 50ª and 50ᵇ. The housing 120 at its free end is provided with a "lift the dot" fastener 125, and it has a loop 126 through which a person may slip a finger and release the fastener 125. It may then be swung back in order that the lever 107 may be moved to cam the detents 95 to an open position.

Various changes in the shape, size, and arrangement of parts may be made to the form of invention herein shown and described, without departing from the spirit of the invention or the scope of the claims.

We claim:

1. In a single point release connector for parachute harnesses the combination of a frame, strap connector detents on the frame normally spring urged to releasably snap into strap retaining position, means to releasably hold said detents inoperative including a pivoted lever, a housing adapted to cover the frame for guarding and preventing premature release operation of sail lever, and means for releasable movement of the housing from its guarding relation with respect to said lever.

2. In a single point release connector for parachute harnesses the combination of a frame, strap connector detents on the frame normally spring urged to releasably snap retaining position, means to releasably hold said detents inoperative including a pivoted lever, a housing for releasably guarding and preventing premature release operation of said lever, said housing being a flexible fabric and having a "lift the dot" snap fastener connection with said casing in order to normally hold said lever in an inoperative position.

3. In a parachute harness quick connector device the combination of a frame, a plurality of spring urged detents mounted on the frame for releasably connecting together the parts of the harness, a single pivoted lever mounted on the frame for simultaneously operating all of said detents to a release position, detent means normally holding said lever inoperative, said detent means including a T-shaped slot in the end of said lever and a plunger on the frame having a T-shaped retaining head releasably connected in the slot of said lever.

4. In a single point release connector for parachute harnesses and the like the combination of a casing, strap connector detents, movable supporting means mounting said detents on the casing, means normally urging said detents to a strap retaining position, a lever pivoted upon said movable supporting means, and a cam extension on said lever at the opposite side of the pivot axis from the lever operable against said casing when the lever is pivotally swung with respect to its supporting means to a release position so that it will move said supporting means and the detents therewith against their normal spring action.

5. In a single point release connector for parachute harnesses and the like the combination of a frame, strap connector detents, movable supporting means mounting said detents on the frame, means normally urging said detents to a strap retaining position, a lever pivoted upon said movable supporting means externally of the frame, a cam extension on said lever operable against said frame so that when the lever is swung to a release position it will move said supporting means and the detents therewith against their normal spring action, and a guard shield on said frame projecting over said cam extension to prevent anything from interfering with action of the cam extension against said frame.

6. In a coupling device for parachute harnesses and the like the combination of a supporting frame, a strap connecting detent, a slidable plunger on the frame movably supporting the detent so that it may move to operative and inoperative positions upon said frame, a lever pivoted on said plunger having a rigid cam extension projecting beyond its pivot axis and operable against said frame so that upon swinging the lever in one position it will move the punger for positioning the detent in an inoperative position.

7. In a parachute harness quick connector device, the combination of a frame, a plurality of spring urged detents mounted on the frame for releasably connecting together the parts of a harness, a single pivoted lever mounted on the frame having connection with the detents for simultaneously operating all of said detents to a release position, said lever having a T-shaped slot in the end thereof including a head portion and a stem, the stem portion of the slot opening at the edge of the lever, and a sliadable plunger on the housing having a reduced extension of less than the width of the stem portion of the T-slot on the lever; the under portion of the plunger beyond said reduced extension being slidable in the head portion of the T-shaped slot in order to hold said lever inoperative with the detents locked in position, said plunger being movable therefrom to position its reduced extension in line with the stem portion of the T-shaped slot of the lever whereby the latter may be swung to a position for opening said detents.

GEORGE WAITE.
HAROLD G. ROGERS.